United States Patent
Curtin (10) Patent No.: US 10,484,399 B1
(45) Date of Patent: Nov. 19, 2019

(54) SYSTEMS AND METHODS FOR DETECTING LOW-DENSITY TRAINING REGIONS OF MACHINE-LEARNING CLASSIFICATION SYSTEMS

(71) Applicant: Symantec Corporation, Mountain View, CA (US)

(72) Inventor: Ryan Curtin, Atlanta, GA (US)

(73) Assignee: Symantec Corporation, Mountain View, CA (US)

( * ) Notice: Subject to any disclaimer, the term of this patent is extended or adjusted under 35 U.S.C. 154(b) by 259 days.

(21) Appl. No.: 15/434,086

(22) Filed: Feb. 16, 2017

(51) Int. Cl.
*H04L 29/06* (2006.01)
*G06F 17/11* (2006.01)
*G06N 20/00* (2019.01)

(52) U.S. Cl.
CPC .......... *H04L 63/1408* (2013.01); *G06F 17/11* (2013.01); *G06N 20/00* (2019.01)

(58) Field of Classification Search
CPC .............. G06N 99/005; H04L 63/1408; H04L 63/1425; G06K 9/6269
See application file for complete search history.

(56) References Cited

U.S. PATENT DOCUMENTS

| | | | |
|---|---|---|---|
| 9,043,247 B1 | 5/2015 | Hart et al. | |
| 9,294,498 B1* | 3/2016 | Yampolskiy | ........ H04L 63/1433 |
| 9,356,941 B1 | 5/2016 | Kislyuk et al. | |
| 2012/0054277 A1* | 3/2012 | Gedikian | ............... G06Q 10/10 709/204 |
| 2012/0227105 A1* | 9/2012 | Friedrichs | ............. G06F 21/564 726/22 |
| 2015/0200962 A1* | 7/2015 | Xu | ......................... G06F 21/562 726/23 |
| 2017/0147941 A1* | 5/2017 | Bauer | .................. G06N 99/005 |
| 2018/0082150 A1* | 3/2018 | Itou | ...................... G06K 9/6248 |

OTHER PUBLICATIONS

Ram et al., "Density Estimate Trees" 2011, pp. 627-635 https://mlpack.org/papers/det.pdf (Year: 2011).*

Masud et al., "Data Mining Tools for Malware Detection" Dec. 2011, pp. 1-680 https://doc.lagout.org/Others/Data%20Mining/Data%20Mining%20Tools%20for%20Malware%20Detection%20%5BMasud%2C%20Khan%20%26%20Thuraisingham%202011-12-07%5D.pdf (Year: 2011).*

(Continued)

*Primary Examiner* — Robert B Leung
*Assistant Examiner* — Carlos M De Jesus Lassala
(74) *Attorney, Agent, or Firm* — FisherBroyles, LLP (57) ABSTRACT

The disclosed computer-implemented method for detecting low-density training regions of machine-learning classification systems may include (i) receiving a training dataset that is used to train a classifier of a machine-learning classification system, (ii) calculating a density estimate of a distribution of the training dataset, (iii) receiving a sample that is to be classified by the classifier, (iv) using the density estimate to determine that the sample falls within a low-density region of the distribution of the training dataset, and (v) performing a security action in response to determining that the sample falls within the low-density region. Various other methods, systems, and computer-readable media are also disclosed.

20 Claims, 6 Drawing Sheets

(56) References Cited

OTHER PUBLICATIONS

Friedland et al., "Classifier-Adjusted Density Estimation for Anomaly Detection and One-Class Classification," researchgate, Apr. 2014, pp. 1-9 https://www.researchgate.net/publication/300575011_Classifier-Adjusted_Density_Estimation_for_Anomaly_Detection_and_One-Class_Classification (Year: 2014).*
Santos et al., "N-Grams-based File Signatures for Malware Detection" researchgate, Jan. 2009, pp. 1-4, https://www.researchgate.net/publication/220710220_N-grams-based_File_Signatures_for_Malware_Detection (Year: 2009).*
Camci, F. and Chinnam, R.; General Support Vector Representation Machine for One-Class Classification of Non-Stationary Classes.
R.K. Snider, A.B. Bonds; Classification of non-stationary neural signals.
Smyth, P.; Gray, A.; and Fayyad, U.; Retrofitting Decision Tree Classifiers Using Kernel Density Estimation.
B.W.Silverman; Density Estimation for Statistics and Data Analysis, Chapter 1 and 2.
Ram, P. and Gray, A.; Density Estimation Trees.
Curtin; Systems and Methods for Determining Whether Malicious Files are Targeted; U.S. Appl. No. 15/268,260, filed Sep. 19, 2016.
Curtin et al.; Systems and Methods for Detecting Label Drift Using Density Estimation in Machine-Learning Classification Systems; U.S. Appl. No. 15/429,444, filed Feb. 10, 2017.

* cited by examiner

SYSTEMS AND METHODS FOR DETECTING LOW-DENSITY TRAINING REGIONS OF MACHINE-LEARNING CLASSIFICATION SYSTEMS

BACKGROUND

Many machine-learning classification systems depend on machine-learning classifiers to detect when unknown samples come from a population of interest (e.g., spam, targeted emails, or malware). Typically, these classifiers are trained using a set of training data that includes samples that are known or believed to come from the population of interest.

Unfortunately, traditional machine-learning approaches to classification may fall short since a traditional machine-learning classifier may not perform well when asked to classify an unknown sample that arises from a different distribution than that of the classifier's training set and will likely return a prediction that is not correct or useful when classifying such samples. For example, a machine-learning classifier that is trained using samples taken, during a particular period of time, from a population whose underlying distribution changes over time may not be able to accurately identify samples taken from the population during a subsequent period of time. Likewise, a machine-learning classifier that was trained using samples taken from a population whose distribution is not representative of the underlying distribution of the population or a certain subpopulation may not be able to accurately identify all samples taken from the population. For example, a classifier that is trained to recognize malware using a training dataset containing only obfuscated malware may not produce any sensible prediction when given non-obfuscated malware to classify. Similarly, a classifier that is trained to recognize sentences as "offensive" or "not offensive" using a training dataset containing only English words may not produce any sensible prediction when given a German sentence to classify. The instant disclosure, therefore, identifies and addresses a need for systems and methods for detecting low-density training regions of machine-learning classification systems.

SUMMARY

As will be described in greater detail below, the instant disclosure describes various systems and methods for detecting low-density training regions of machine-learning classification systems. In one example, a method for detecting low-density training regions of machine-learning classification systems may include (i) receiving a training dataset that is used to train a classifier of a machine-learning classification system, (ii) calculating a density estimate of a distribution of the training dataset, (iii) receiving a sample that is to be classified by the classifier, (iv) using the density estimate to determine that the sample falls within a low-density region of the distribution of the training dataset, and (v) performing a security action in response to determining that the sample falls within the low-density region.

In some examples, the step of calculating the density estimate may include generating a density estimation tree using the training dataset, and the step of using the density estimate to determine that the sample falls within the low-density region of the distribution of the training dataset may include (i) determining that the sample maps to a node in the density estimation tree and (ii) determining that a density represented by the node is below a predetermined threshold.

In some examples, the method may further include determining, based at least in part on the sample falling within the low-density region, that the classifier will not accurately classify the sample, and the step of performing the security action may include refraining from classifying the sample with the classifier based at least in part on determining that the classifier will not accurately classify the sample. In at least one example, the method may further include (i) receiving an additional training dataset that is used to train an additional classifier of the machine-learning classification system, (ii) calculating an additional density estimate of a distribution of the additional training dataset, (iii) using the additional density estimate to identify a high-density region of the distribution of the additional training dataset, and (iv) determining that the sample falls within the high-density region of the distribution of the additional training dataset. In such an example, the step of performing the security action may include using, based at least in part on determining that the sample falls within the low-density region and the sample falls within the high-density region, the additional classifier rather than the classifier to determine a classification of the sample.

In some examples, the method may further include determining, based at least in part on the sample falling within the low-density region, that the classifier may not accurately classify the sample, and the step of performing the security action may include (i) using the classifier to determine a classification of the sample and (ii) associating a lower confidence level to the classification. In certain examples, the step of performing the security action may include assigning a default classification to the sample without using the classifier in order to avoid an assignment of a false-positive classification to the sample by the classifier. In at least one example, the step of determining that the sample falls within the low-density region of the distribution of the training dataset may be performed before the classifier is used to classify the sample.

In some examples, the training dataset may include malicious applications and/or benign applications. In other examples, the training dataset may include malicious webpages and/or benign webpages. In at least one example, the training dataset may include malicious emails and/or benign emails.

In one embodiment, a system for detecting low-density training regions of machine-learning classification systems may include several modules stored in memory, including (i) a receiving module that receives (a) a training dataset that is used to train a classifier of a machine-learning classification system and (b) a sample that is to be classified by the classifier, (ii) an estimating module that calculates a density estimate of a distribution of the training dataset, (iii) a determining module that uses the density estimate to determine that the sample falls within a low-density region of the distribution of the training dataset, and (iv) a security module that performs a security action in response to determining that the sample falls within the low-density region. In at least one example, the system may also include at least one physical processor that executes the receiving module, the estimating module, the determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a training dataset that is used to train a classifier of a machine-learning classification system, (ii) calculate a density estimate of a distribution of the training dataset, (iii) receive a sample that is to be classified by the classifier, (iv) use the density estimate to determine that the sample falls within a low-density region of the distribution of the training dataset, and (v) perform a security action in response to determining that the sample falls within the low-density region.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting low-density training regions of machine-learning classification systems. As will be explained in greater detail below, by using a density estimate (e.g., a density estimation tree) of a distribution of a machine-learning classifier's training dataset to determine when unknown samples fall within low-density regions of the distribution, the systems and methods described herein may enable a machine-learning classification system to know when to refrain from using the classifier to classify the unknown samples, which may have resulted in misclassifications of the unknown samples, thus improving the performance and accuracy of the classifier. Furthermore, in some examples, by determining when unclassified samples fall within low-density regions of the distribution of a classifier's training dataset, these systems and methods may enable a machine-learning classification system to identify and select more suitable classifiers to classify the unknown samples.

In addition, the systems and methods described herein may improve the functioning of a computing device by detecting potentially malicious files, webpages, or emails with increased accuracy and thus reducing the computing device's likelihood of infection. These systems and methods may also improve the fields of computer security and/or enterprise-level security by tailoring the classifiers that are used to classify unknown samples to the unknown samples. Embodiments of the instant disclosure may also provide various other advantages and features, as discussed in greater detail below.

Figure 1:
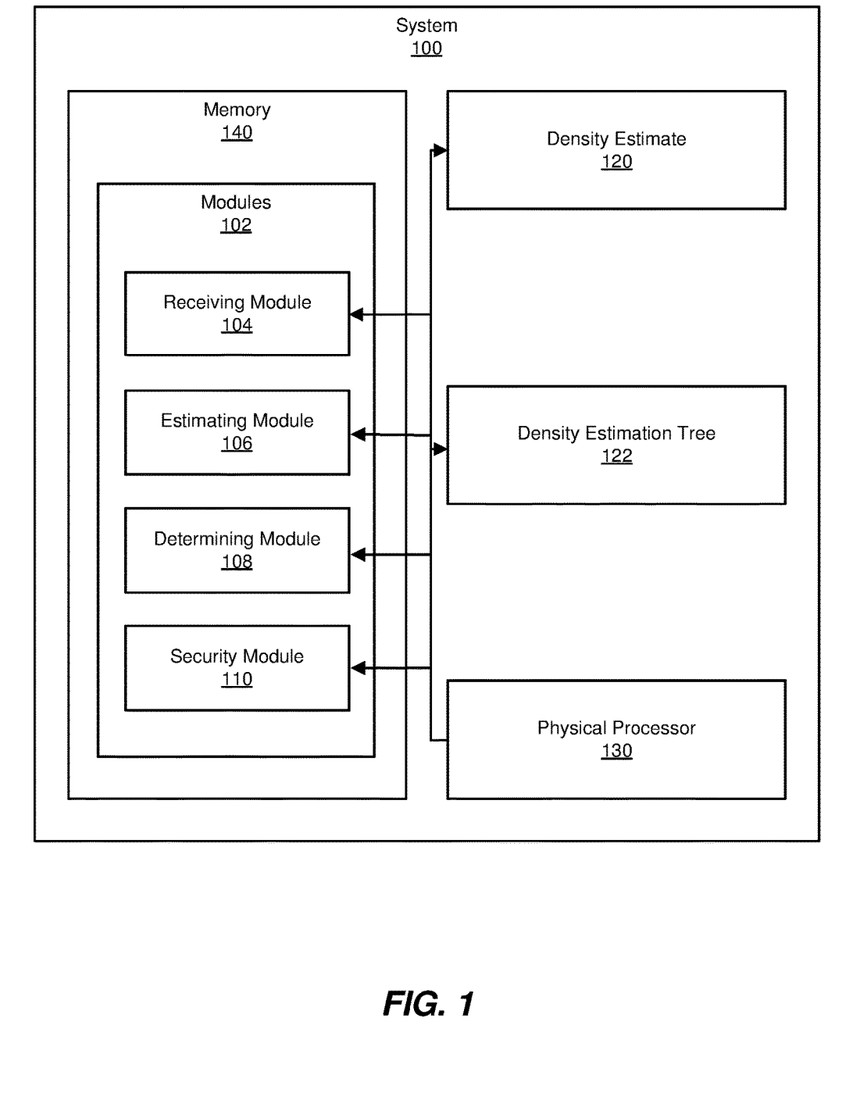
FIG. 1 is a block diagram of an example system for detecting low-density training regions of machine-learning classification systems.
Figure 2:
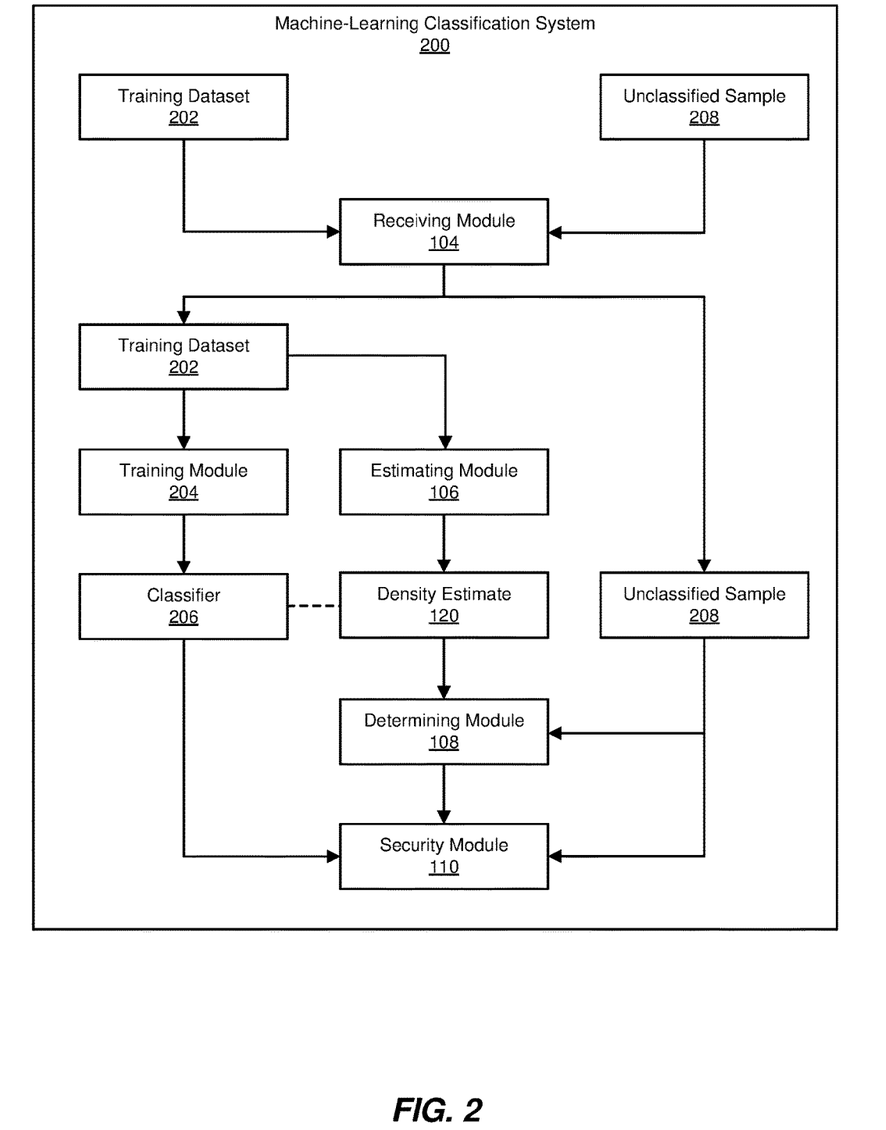
FIG. 2 is a block diagram of an additional example system for detecting low-density training regions of machine-learning classification systems.

The following will provide, with reference to FIGS. 1-2, detailed descriptions of example systems for detecting low-density training regions of machine-learning classification systems. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting low-density training regions of machine-learning classification systems. As illustrated in this figure, example system 100 may include one or more modules 102 for performing one or more tasks. As will be explained in greater detail below, modules 102 may include a receiving module 104, an estimating module 106, a determining module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices that make up machine-learning classification system 200 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting low-density training regions of machine-learning classification systems. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more density estimates, such as density estimate 120 and density estimation tree 122. Density estimate 120 generally represents any type or form of density estimate that is used to model the distribution of a set of samples. Density estimation tree 122 generally represents any type or form of tree data-structure that represents a density estimate. In one example, density estimate 120 may be an estimated probability density function (e.g., a density estimate calculated using kernel density estimation) that models the distribution of a set of samples that were selected from a population of interest and used to train a machine-learning classifier to identify other samples from the population.

Example system 100 in FIG. 1 may be implemented in a variety of ways. For example, all or a portion of example system 100 may represent portions of example machine-learning classification system 200 in FIG. 2. As will be described in greater detail below, one or more of modules 102 from FIG. 1 may, when executed by at least one processor of machine-learning classification system 200, enable machine-learning classification system 200 to detect low-density training regions. For example, and as will be described in greater detail below, one or more of modules 102 may cause machine-learning classification system 200 to (i) receive a training dataset 202 that may be used by training module 204 to train a classifier 206 of machine-learning classification system 200, (ii) calculate density estimate 120 to model a distribution of training dataset 202, (iii) receive an unclassified sample 208 that may be classified by classifier 206, (iv) use density estimate 120 to determine that unclassified sample 208 falls within a low-density region of the distribution of training dataset 202, and (v) perform a security action in response to determining that unclassified sample 208 falls within the low-density region.

Machine-learning classification system 200 generally represents any type or form of computing device or computing devices capable of reading computer-executable instructions. Examples of machine-learning classification system 200 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. Additional examples of machine-learning classification system 200 include, without limitation, security servers, application servers, web servers, storage servers, and/or database servers configured to run certain software applications and/or provide various security, web, storage, and/or database services. Although illustrated as a single entity in FIG. 2, machine-learning classification system 200 may include and/or represent a plurality of servers that work and/or operate in conjunction with one another.

Training dataset 202 generally represents any type or form of data, statistics, and/or other information known about the features of a set of samples that are known or believed to come from a population of interest and that may be used to train a machine-learning classifier to identify unknown or unclassified samples that also belong to the population of interest. Examples of training dataset 202 include, without limitation, information about a set of applications that are known to be malicious or benign that may be used to train a classifier to classify newly encountered applications as either malicious or benign, information about a set of webpages that are known to be malicious or benign that may be used to train a classifier to classify newly encountered webpages as either malicious or benign, and/or information about a set of emails that are known to be malicious or benign that may be used to train a classifier to classify newly encountered emails as either malicious or benign. Training module 204 generally represents one or more software applications or programs that, when executed by a computing device, may cause the computing device to train classifier 206 using training dataset 202. Classifier 206 generally represents any algorithm, formula, rule, module, and/or filter for classifying, labeling, categorizing, rating, and/or scoring an input. Examples of classifier 206 include, without limitation, a linear classifier, a non-linear classifier, a perceptron, a naive Bayes classifier, a support vector machine, a neural network, a decision tree, and/or any other suitable classification algorithm. In one example, the set of classifiers may include N voting large margin perceptrons.

Figure 3:
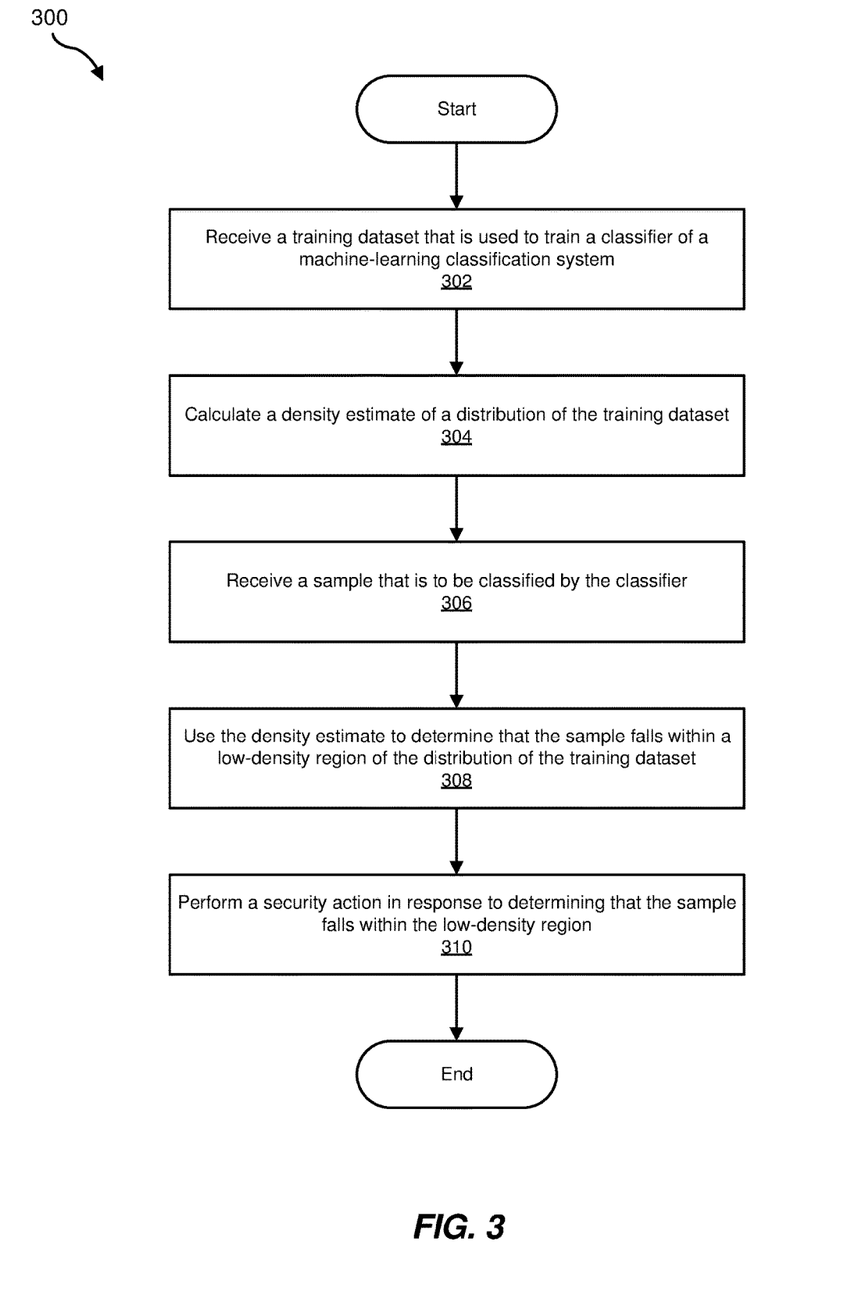
FIG. 3 is a flow diagram of an example method for detecting low-density training regions of machine-learning classification systems.

FIG. 3 is a flow diagram of an example computer-implemented method 300 for detecting low-density training regions of machine-learning classification systems. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a training dataset that is used to train a classifier of a machine-learning classification system. For example, receiving module 104 may, as part of machine-learning classification system 200 in FIG. 2, receive a training dataset 202 that may be used by training module 204 to train a classifier 206 of machine-learning classification system 200.

The systems described herein may perform step 302 in any suitable manner. For example, receiving module 104 may receive a training dataset from one or more human analysts that have manually labeled samples represented in the training dataset. In other examples, receiving module 104 may compile a training dataset that includes samples that have been labeled by a machine-learning classification system using a suitable unsupervised or semi-supervised machine-learning technique. In some examples, receiving module 104 may receive a training dataset that has already been used to train a classifier. In other examples, receiving module 104 may receive a training dataset that will be used to train a classifier.

At step 304, one or more of the systems described herein may calculate a density estimate of a distribution of the training dataset. For example, estimating module 106 may, as part of machine-learning classification system 200 in FIG. 2, calculate density estimate 120 to model a distribution of training dataset 202.

As used herein, the term "distribution" generally refers to how a set of items are collectively distributed within a feature space. In some examples, the term "distribution" may refer to how a set of items that have been sampled from a population are distributed within or mapped to a feature space. Additionally or alternatively, the term "distribution" may refer to how some or all of the items within a population are distributed within or mapped to a feature space. In general, the way in which individual items from a population are mapped to a feature space will vary such that some regions of the feature space will have more items mapped to them while other regions will have less items mapped to them. Regions of a feature space to which a high number of items are mapped may have higher densities and may be considered high-density regions of a distribution, while regions of a feature space to which a low number of items are mapped may have lower densities and may be considered low-density regions of the distribution.

In general, items within a distribution that are mapped to high-density regions may be considered to be representative of the other items in the distribution, while items within a distribution that are mapped to low-density regions may be considered to be not representative of the other items in the distribution. For at least this reason, a machine-learning classifier that is trained using a particular set of training samples may accurately classify unknown samples that map to high-density regions of the distribution of training samples since the training samples are likely to be representative of these unknown samples. However, the machine-learning classifier may inaccurately classify other unknown samples that map to low-density regions of the distribution of training samples since the training samples are not likely to be representative of these other unknown samples.

Figure 4:
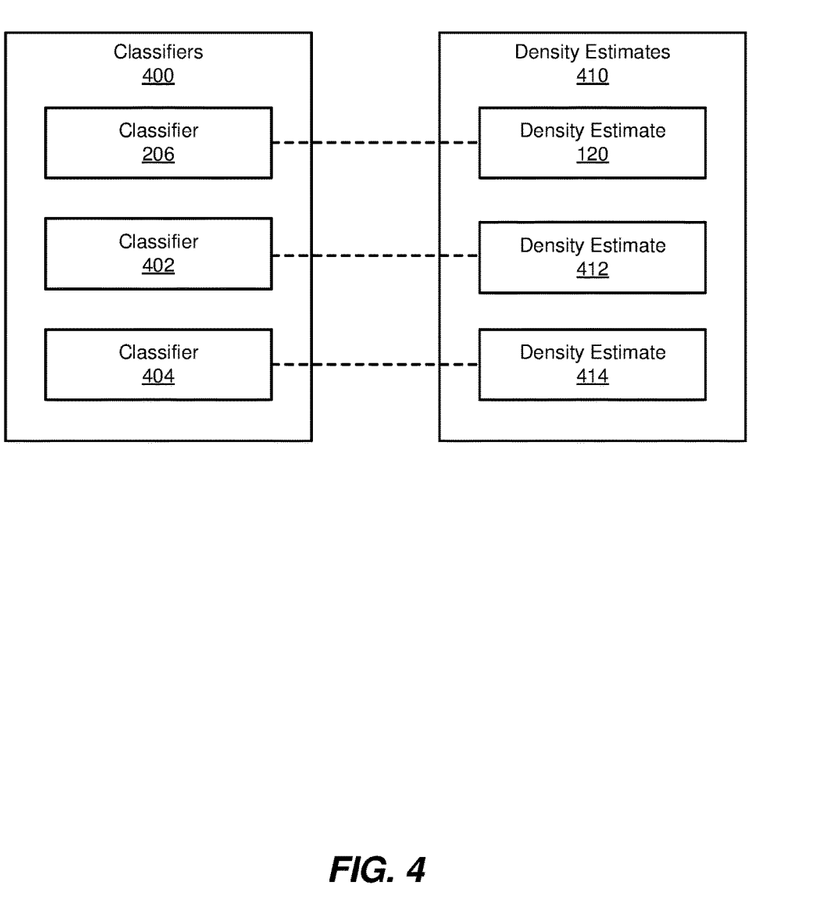
FIG. 4 is a block diagram of example classifiers and their associated example density estimates.

Returning to FIG. 3, the systems described herein may calculate a density estimate using any suitable density-estimation techniques. In at least one example, estimating module 106 may model the distribution of a set of training samples using a density estimation tree. Alternatively, estimating module 106 may model the distribution of a set of samples using kernel density estimation. Upon calculating a density estimate of a distribution of a classifier's training dataset, estimating module 106 may associate the density estimate with the classifier. Using FIG. 2 as an example, upon calculating density estimate 120 to model a distribution of training dataset 202, estimating module 106 may associate density estimate 120 with classifier 206. Using FIG. 4 as an additional example, upon calculating density estimate 120, density estimate 412, and density estimate 414 to model the distributions of classifier 206, classifier 402, and classifier 404, respectively; estimating module 106 may associate density estimate 120, density estimate 412, and density estimate 414 to their respective classifiers as shown in FIG. 4. In this manner, the systems and methods described herein may generate a density estimate for each of a machine-learning classification system's classifiers. In some examples, estimating module 106 may distribute a classifier and its associated density estimate to one or more computing devices on which the classifier will be used to classify data.

In some examples, estimating module 106 may build a density estimation tree from a set of training samples by (1) recursively splitting the feature space of the training dataset into regions based on features of the samples in the training dataset such that each node in the density estimation tree represents a region of the feature space and leaf nodes in the density estimation tree represent the smallest divisions of the feature space, (2) mapping each sample in the training dataset to a region of the feature space that is represented by a leaf node in the density estimation tree, and (3) calculating a density for each region represented by a leaf node in the density estimation tree based on the number of samples that have been mapped to the region (e.g., a region may have a high density if a large number of samples are mapped to the region or a region may have a low density if a small number of samples are mapped to the region) and/or the size of the region.

At step 306, one or more of the systems described herein may receive a sample that is to be classified by the classifier. For example, receiving module 104 may, as part of machine-learning classification system 200 in FIG. 2, receive an unclassified sample 208 that may be classified by classifier 206. The systems described herein may perform step 308 in any suitable manner. In general, receiving module 104 may receive an unclassified sample that will be classified by a machine-learning classification system as part of the machine-learning classification system's classification pipeline.

At step 308, one or more of the systems described herein may use the density estimate to determine that the sample falls within a low-density region of the distribution of the training dataset. For example, determining module 108 may, as part of machine-learning classification system 200 in FIG. 2, use density estimate 120 to determine that unclassified sample 208 falls within a low-density region of the distribution of training dataset 202.

As used herein, the term "low-density region" generally refers to any region or point of a training dataset's distribution whose density falls below a predetermined threshold. Similarly, the term "high-density region" generally refers to any region or point of a training dataset's distribution whose density is above a predetermined threshold.

The systems described herein may use a density estimate to determine that a sample falls within a low-density region or a high-density region of a distribution of a training dataset in any suitable manner. In general, determining module 108 may determine that an unknown sample falls within a low-density region of a distribution of a training dataset by (1) mapping the unknown sample to a region of a distribution's feature space, (2) identifying the density of that region, and (3) determining that the identified density is below a predetermined threshold value. Similarly, determining module 108 may determine that an unknown sample falls within a high-density region of a distribution of a training dataset by (1) mapping the unknown sample to a region of a distribution's feature space, (2) identifying the density of that region, and (3) determining that the identified density is above a predetermined threshold value. If a density estimate is a density estimation tree, determining module 108 may determine that an unknown sample falls within a low-density region of a distribution of a training dataset by (1) mapping the unknown sample to a leaf node within the density estimation tree, (2) identifying the density associated by the leaf node, and (3) determining that the identified density is below a predetermined threshold value.

At step 310, one or more of the systems described herein may perform a security action in response to determining that the sample falls within the low-density region. For example, security module 110 may, as part of machine-learning classification system 200 in FIG. 2, perform a security action in response to determining that unclassified sample 208 falls within a low-density region of the distribution of training dataset 202.

The systems described herein may perform step 310 in any suitable manner. As mentioned above, a machine-learning classifier that is trained using a particular set of training samples may inaccurately classify unknown samples that map to low-density regions of the distribution of the training samples since the training samples may not be representative of these unknown samples. For at least this reason, in one example, security module 110 may, in response to determining that an unknown sample maps to a low-density region of the distribution of a classifier's training samples, classify the sample using a different classifier that may perform better. As also mentioned above, a machine-learning classifier that is trained using a particular set of training samples may accurately classify unknown samples that map to high-density regions of the distribution of the training samples since the training samples may be representative of these unknown samples. For at least this reason, in one example, security module 110 may, in response to determining that an unknown sample maps to a high-density region of the distribution of a classifier's training samples, classify the sample using the classifier.

Alternatively, security module 110 may classify the sample using the classifier and may assign a confidence score to the classification of the unknown classification that is based on the density of the low-density region to which the unknown sample is mapped. For example, if an unknown sample maps to a low-density region, security module 110 may assign a low confidence to a classification of the unknown sample. Similarly, if an unknown sample maps to a high-density region, security module 110 may assign a high confidence to a classification of the unknown sample.

In some examples, security module 110 may, in response to determining that an unknown sample maps to a low-density region of a distribution of a classifier's training samples, assign a default or alternative classification to the unknown sample rather than using the classifier to classify the unknown sample. In some situations, a misclassification of an unknown sample using an inaccurate classifier may result in a harmful false-positive or a harmful false-negative classification being assigned to the unknown sample. In these situations, security module 110 may, in response to determining that an unknown sample maps to a low-density region of a distribution of a classifier's training samples, assign a default or alternative non-harmful classification to the unknown sample. Upon completion of step 310, exemplary method 300 in FIG. 3 may terminate.

As explained above, by using a density estimate (e.g., a density estimation tree) of a distribution of a machine-learning classifier's training dataset to determine when unknown samples fall within low-density regions of the distribution, the systems and methods described herein may enable a machine-learning classification system to know when to refrain from using the classifier to classify the unknown samples, which may have resulted in misclassifications of the unknown samples, thus improving the performance and accuracy of the classifier. Furthermore, in some examples, by determining when unclassified samples fall within low-density regions of the distribution of a classifier's training dataset, these systems and methods may enable a machine-learning classification system to identify and select more suitable classifiers to classify the unknown samples. In at least one example, the systems and methods described herein may assume that classifying a point in a region of low density (or no density) will produce bad results. In such an example, the systems and methods disclosed herein may, when given a test point to classify, first calculate the density at the test point. If the density is below some threshold, the systems and methods disclosed herein may perform an alternate action.

Figure 5:
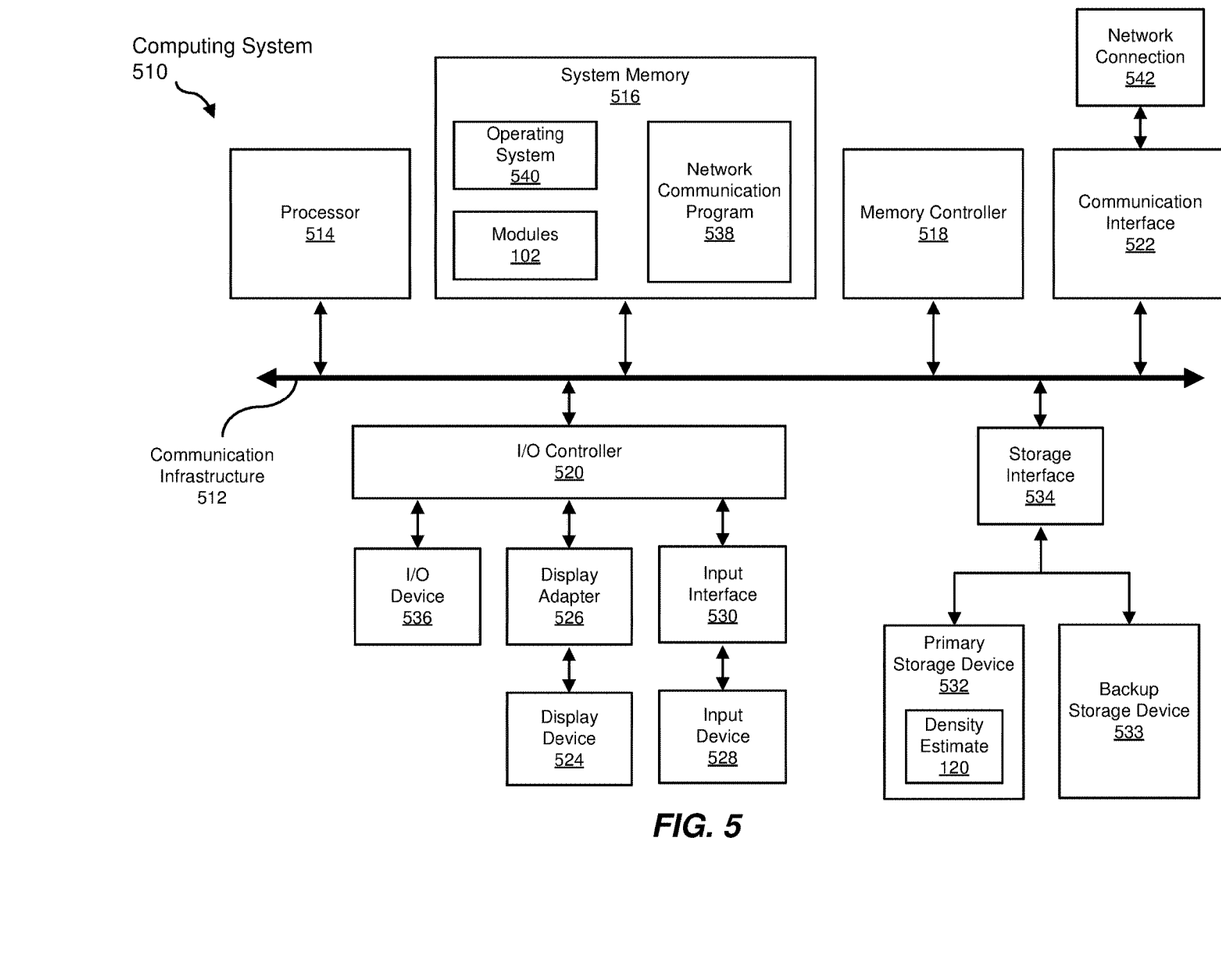
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, density estimate 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
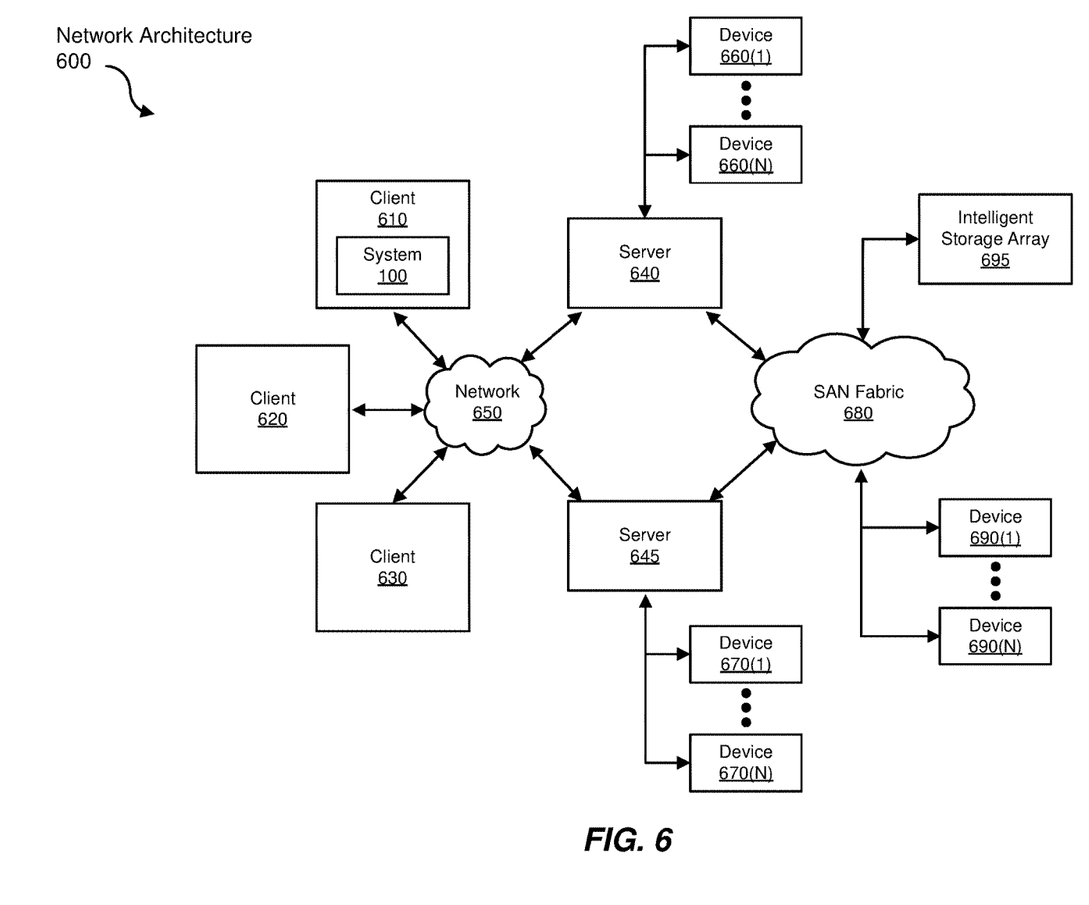
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting low-density training regions of machine-learning classification systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a training dataset that is used to train a classifier of a machine-learning classification system to be transformed, transform the training dataset into a density estimate that models a distribution of the training dataset, output a result of the transformation to the machine-learning classification system, use the result of the transformation to determine whether an unknown sample falls within a low-density region of the distribution of the training dataset, and store the result of the transformation to a density-estimate storage system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting low-density training regions of machine-learning classification systems, at least a portion of the method being performed by a computing device comprising at least one processor, the method comprising:
    receiving a training dataset;
    training, using the training dataset, a classifier of a machine-learning classification system;
    calculating, using the training dataset, a density-estimation model comprising a density estimate of a distribution of the training dataset;
    associating the density-estimation model with the classifier;
    receiving a sample that is to be classified;
    using, before classifying the sample using the classifier, the density-estimation model to determine that the sample falls within a low-density region of the distribution of the training dataset;
    determining, based at least in part on the sample falling within the low-density region, that the classifier will not accurately classify the sample; and
    performing a security action in response to determining that the classifier will not accurately classify the sample.

2. The computer-implemented method of claim 1, wherein:
    calculating the density-estimation model comprises generating a density estimation tree using the training dataset; and
    using the density-estimation model to determine that the sample falls within the low-density region of the distribution of the training dataset comprises:
        determining that the sample maps to a node in the density estimation tree; and
        determining that a density represented by the node is below a predetermined threshold.

3. The computer-implemented method of claim 1, wherein performing the security action comprises refraining from classifying the sample with the classifier.

4. The computer-implemented method of claim 3, further comprising:
    receiving an additional training dataset;
    training, using the additional training dataset, an additional classifier of the machine-learning classification system;
    calculating, using the additional training dataset, an additional density-estimation model comprising an additional density estimate of a distribution of the additional training dataset;
    associating the additional density-estimation model with the additional classifier; and
    using the additional density-estimation model to determine that the sample falls within a high-density region of the distribution of the additional training dataset, wherein performing the security action comprises using, based at least in part on determining that the sample falls within the low-density region and the sample falls within the high-density region, the additional classifier rather than the classifier to determine a classification of the sample.

5. The computer-implemented method of claim 1, wherein performing the security action comprises:
    using the classifier to determine a classification of the sample; and
    associating a lower confidence level to the classification.

6. The computer-implemented method of claim 1, wherein performing the security action comprises assigning a default classification to the sample without using the classifier in order to avoid an assignment of a false-positive classification to the sample by the classifier.

7. The computer-implemented method of claim 1, wherein the density-estimation model comprises a density estimation tree.

8. The computer-implemented method of claim 1, wherein the training dataset comprises at least one of:
    malicious applications; and
    benign applications.

9. The computer-implemented method of claim 1, wherein the training dataset comprises at least one of:
    malicious webpages; and
    benign webpages.

10. The computer-implemented method of claim 1, wherein the training dataset comprises at least one of:
    malicious emails; and
    benign emails.

11. A system for detecting low-density training regions of machine-learning classification systems, the system comprising:
    a receiving module, stored in memory, that receives:
        a training dataset; and
        a sample that is to be classified;
    a training module, stored in memory, that trains, using the training dataset, a classifier;

an estimating module, stored in memory, that calculates, using the training dataset, a density-estimation model comprising a density estimate of a distribution of the training dataset;

a determining module, stored in memory, that uses the density-estimation model to determine that the sample falls within a low-density region of the distribution of the training dataset;

a security module, stored in memory, that:
  determines, based at least in part on the sample falling within the low-density region, that the classifier will not accurately classify the sample; and
  performs a security action in response to determining that the classifier will not accurately classify the sample; and at least one physical processor that executes the receiving module, the training module, the estimating module, the determining module, and the security module.

12. The system of claim 11, wherein:
the estimating module calculates the density-estimation model by generating a density estimation tree using the training dataset; and
the determining module uses the density-estimation model to determine that the sample falls within the low-density region of the distribution of the training dataset by:
  determining that the sample maps to a node in the density estimation tree; and
  determining that a density represented by the node is below a predetermined threshold.

13. The system of claim 11, wherein
the security module performs the security action by refraining from classifying the sample with the classifier.

14. The system of claim 13, wherein:
the receiving module further receives an additional training dataset;
the training module further trains, using the additional training dataset, an additional classifier;
the estimating module further calculates, using the additional training dataset, an additional density-estimation mode comprising an additional density estimate of a distribution of the additional training dataset;
the determining module further uses the additional density-estimation model to determine that the sample falls within a high-density region of the distribution of the additional training dataset; and the security module performs the security action by using, based at least in part on the sample falling within the low-density region and the sample falling within the high-density region, the additional classifier rather than the classifier to determine a classification of the sample.

15. The system of claim 11, wherein
the security module performs the security action by:
using the classifier to determine a classification of the sample; and
associating a lower confidence level to the classification.

16. The system of claim 11, wherein the security module performs the security action by assigning a default classification to the sample without using the classifier in order to avoid an assignment of a false-positive classification to the sample by the classifier.

17. The system of claim 11, wherein the density-estimation model comprises a density estimation tree.

18. The system of claim 11, wherein the training dataset comprises at least one of:
malicious applications; and
benign applications.

19. The system of claim 11, wherein the training dataset comprises at least one of:
malicious webpages; and
benign webpages.

20. A non-transitory computer-readable medium comprising one or more computer-executable instructions that, when executed by at least one processor of a computing device, cause the computing device to:
receive a training dataset;
train, using the training dataset, a classifier of a machine-learning classification system;
calculate, using the training dataset, a density-estimation model comprising a density estimate of a distribution of the training dataset;
associate the density-estimation model with the classifier;
receive a sample that is to be classified;
use, before classifying the sample using the classifier, the density-estimation model to determine that the sample falls within a low-density region of the distribution of the training dataset;
determine, based at least in part on the sample falling within the low-density region, that the classifier will not accurately classify the sample; and
perform a security action in response to determining that the classifier will not accurately classify the sample.

* * * * *